US008135669B2

(12) United States Patent
Olstad et al.

(10) Patent No.: US 8,135,669 B2
(45) Date of Patent: Mar. 13, 2012

(54) INFORMATION ACCESS WITH USAGE-DRIVEN METADATA FEEDBACK

(75) Inventors: Bjørn Olstad, Stathelle (NO); Christian Moen, Oslo (NO)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 11/792,778

(22) PCT Filed: Oct. 13, 2006

(86) PCT No.: PCT/NO2006/000355
§ 371 (c)(1),
(2), (4) Date: Aug. 17, 2007

(87) PCT Pub. No.: WO2007/043893
PCT Pub. Date: Apr. 19, 2007

(65) Prior Publication Data
US 2008/0097985 A1     Apr. 24, 2008

(30) Foreign Application Priority Data
Oct. 13, 2005    (NO) .................................. 20054720

(51) Int. Cl.
*G06F 17/30*    (2006.01)
(52) U.S. Cl. ...................................... 707/608; 707/706
(58) Field of Classification Search .................. 707/706, 707/608
See application file for complete search history.

(56) References Cited

U.S. PATENT DOCUMENTS

| | | | |
|---|---|---|---|
| 6,327,590 B1* | 12/2001 | Chidlovskii et al. .......... | 707/734 |
| 2002/0142842 A1* | 10/2002 | Easley et al. .................... | 463/42 |
| 2002/0152278 A1* | 10/2002 | Pontenzone et al. .......... | 709/217 |
| 2003/0050927 A1* | 3/2003 | Hussam ............................ | 707/5 |
| 2003/0122873 A1* | 7/2003 | Dieberger et al. ............ | 345/764 |
| 2003/0233344 A1 | 12/2003 | Kuno et al. | |
| 2004/0267742 A1* | 12/2004 | Polson et al. ..................... | 707/5 |
| 2006/0004703 A1* | 1/2006 | Spivack et al. .................... | 707/2 |
| 2007/0255702 A1* | 11/2007 | Orme ................................ | 707/5 |

FOREIGN PATENT DOCUMENTS

WO    WO-2005/091175 A1    9/2005

OTHER PUBLICATIONS

Wikipedia, CAPTCHA (accessed Nov. 20, 2009).*
IEEE, 1484.12.1—Draft Standard for Learning Object Metadata (Jul. 15, 2002).*
Wikipedia, Wiki (Jun. 10, 2007).*
W3C, RDF/XML Syntax Specification (Revised) (Feb. 10, 2004).*
Platypus Wiki: a Semantic Wiki Wiki Web, published Apr. 17, 2004 (accessed Feb. 24, 2011).*
Wikipedia, Wikipedia:How to edit a page, published Oct. 12, 2004 (accessed Feb. 23, 2011).*

(Continued)

*Primary Examiner* — James Trujillo
*Assistant Examiner* — William Spieler
(74) *Attorney, Agent, or Firm* — Merchant & Gould

(57) ABSTRACT

In a method for displaying and capturing metadata of documents within result presentations in information access or search systems, a metadata server is used for storing a metadata associated with any searchable document and the end users are given the opportunity to view and edit metadata associated with documents returned from the metadata server which is capable of automatically creating metadata objects associated with any combination of document query and document position in a result set for a given query A search engine capable of implementing the method comprises a metadata server as part of or connected with its core search engine.

19 Claims, 22 Drawing Sheets

OTHER PUBLICATIONS

Figure 1:
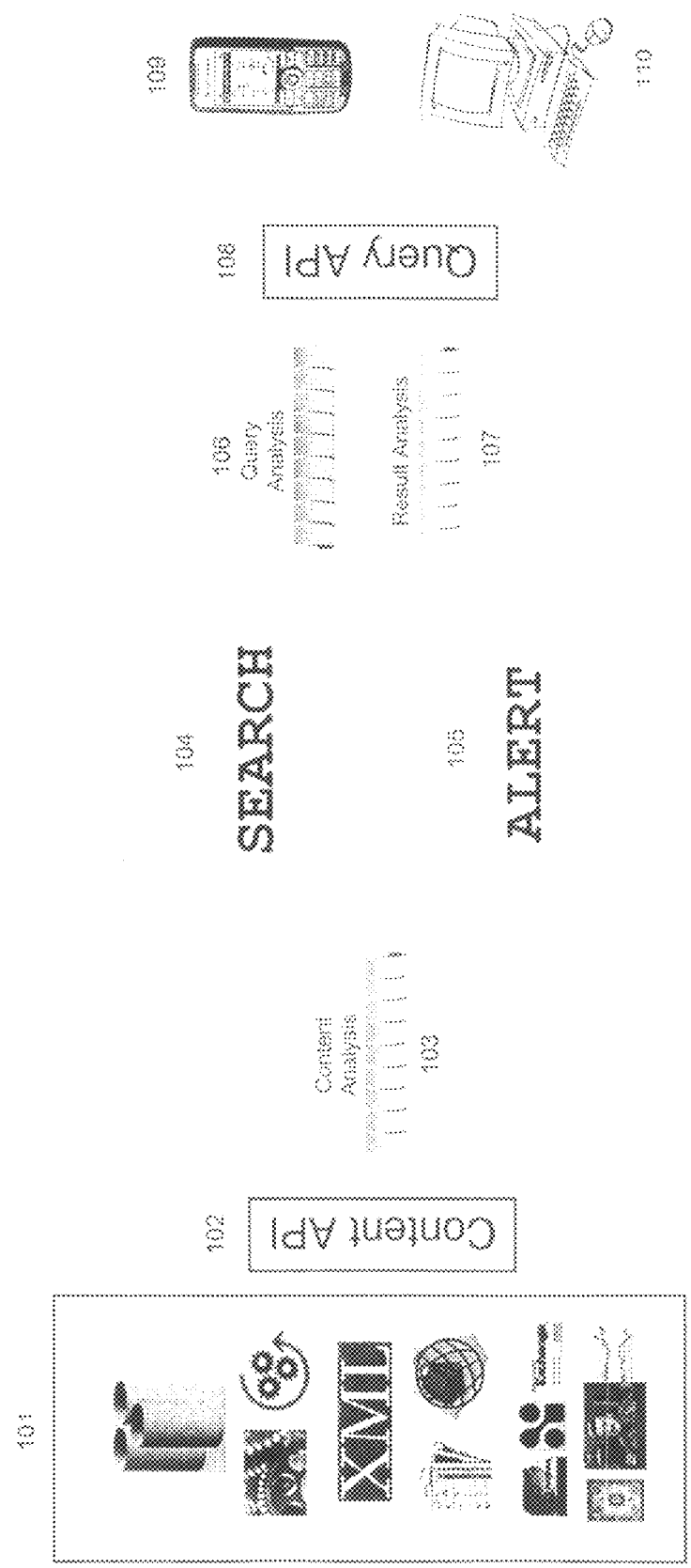

Wikimedia Commons, Main Page, published Oct. 12, 2004 (accessed Feb. 23, 2011).*

Wikipedia, Help:Section, published Sep. 20, 2004 (accessed Feb. 23, 2011).*

Wikipedia, Help:Searching, published Oct. 12, 2004 (accessed Feb. 23, 2011).*

Wikipedia, Help:Using talk pages, published Sep. 20, 2004 (accessed Feb. 23, 2011).*

Wikipedia, Help:Page history, published Oct. 12, 2004 (accessed Feb. 23, 2011).*

Examination Report issued in Application No. GB0711267.5 on May 6, 2010, 5 pages.

* cited by examiner

Fig. 3

*Nature* 413, 814 - 821 (25 October 2001); doi:10.1038/35101544

Structural basis for the interaction of antibiotics with the peptidyl transferase centre in eubacteria FRANK SCHLÜNZEN[†], RAZ ZARIVACH[†‡], JÖRG HARMS[*†], ANAT BASHAN[‡], ANTE TOCILJ[*§], RENATE ALBRECHT[§], ADA YONATH[*‡] & FRANÇOIS FRANCESCHI[§]

[*] Max-Planck-Research, Unit for Ribosomal Structure, Notkestrasse 85, 22603 Hamburg, Germany
[‡] Department of Structural Biology, Weizmann Institute, 76100 Rehovot, Israel
[§] Max-Planck-Institut für Molekulare Genetik, Ihnestrasse 73, 14195 Berlin, Germany
[†] These authors contributed equally to this work Correspondence and requests for materials should be addressed to F.F. (e-mail: Franceschi@molgen.mpg.de). Coordinates have been deposited in the Protein Data Bank under accession numbers 1JZX, 1JZY, 1JZZ, 1K00 and 1K01.

Ribosomes, the site of protein synthesis, are a major target for natural and synthetic antibiotics. Detailed knowledge of antibiotic binding sites is central to understanding the mechanisms of drug action. Conversely, drugs are excellent tools for studying the ribosome function. To elucidate the structural basis of ribosome–antibiotic interactions, we determined the high-resolution X-ray structures of the 50S ribosomal subunit of the eubacterium *Deinococcus radiodurans*, complexed with the clinically relevant antibiotics chloramphenicol, clindamycin and the three macrolides erythromycin, clarithromycin and roxithromycin. We found that antibiotic binding sites are composed exclusively of segments of 23S ribosomal RNA at the peptidyl transferase cavity and do not involve any interaction of the drugs with ribosomal proteins. Here we report the details of antibiotic interactions with the components of their binding sites. Our results also show the importance of putative $Mg^{+2}$ ions for the binding of some drugs. This structural analysis should facilitate rational drug design.

Fig. 4

*Nature 413, 814 - 821 (25 October 2001); doi:10.1038/35101544*

Structural basis for the interaction of antibiotics with the peptidyl transferase centre in eubacteria FRANK SCHLÜNZEN, RAZ ZARIVACH, JÖRG HARMS, ANAT BASHAN, RENATE ALBRECHT§, ADA YONATH*§ & FRANÇOIS FRANCESCHI§

*Max-Planck-Research Unit for Ribosomal Structure, Notkestrasse 85, 22603 Hamburg, Germany
† Department of Structural Biology, Weizmann Institute, 76100 Rehovot, Israel
§ Max-Planck-Institute for Molecular Genetic, Ihnestrasse 73, 14195 Berlin, Germany Correspondence and requests for materials should be addressed to F. Schlünzen. Reprints/info@mpgars.mpg.de). Coordinates have been deposited in the Protein Data Bank under accession numbers 1JZX, 1JZY, 1JZZ, 1K00 and 1K01.

Ribosomes, the site of protein synthesis, are a major target for natural and synthetic antibiotics. Detailed knowledge of antibiotic binding sites is central to understanding the mechanisms of drug action. Conversely, drugs are excellent tools for studying the ribosome function. Using X-ray crystallographic analysis of the 50S ribosomal subunit of the eubacterium *Deinococcus radiodurans*, complexed with the clinically relevant antibiotics chloramphenicol, clindamycin and the three macrolides erythromycin, clarithromycin and roxithromycin. We found that antibiotic binding sites are composed exclusively of segments of 23S ribosomal RNA at the peptidyl transferase cavity and do not involve any interaction of the drugs with ribosomal proteins. Here we report the details of antibiotic interactions with the components of their binding sites. Our results also show the importance of putative Mg$^{2+}$ ions for the binding of some drugs. This structural analysis should facilitate rational drug design.

Fig. 5

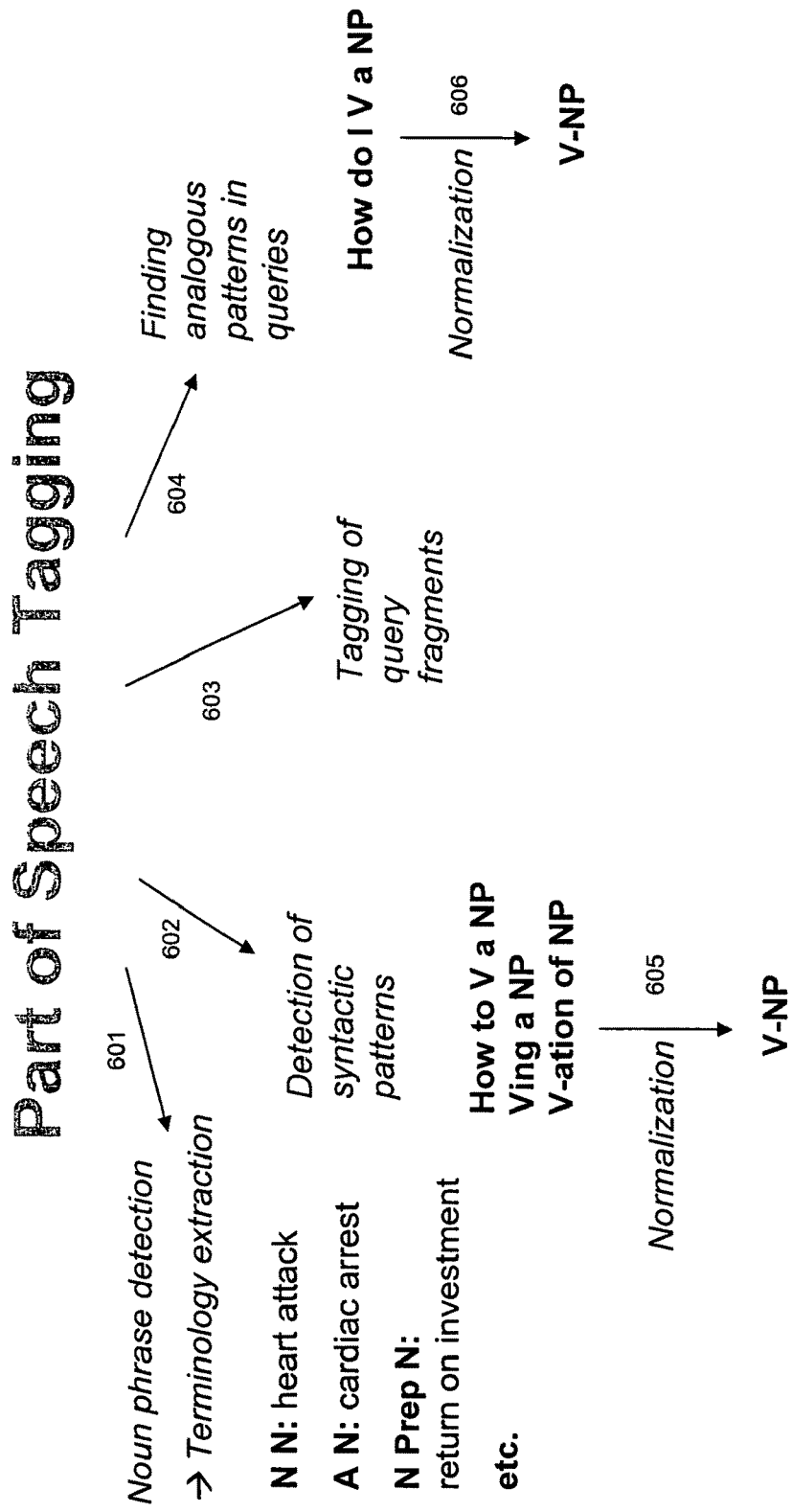

Fig. 7

*Nature* 413, 814 - 821 (25 October 2001); doi:10.1038/35101544

Structural basis for the interaction of antibiotics with the peptidyl transferase centre in eubacteria FRANK SCHLÜNZEN†, RAZ ZARIVACH†‡, JÖRG HARMS*†, ANAT BASHAN‡, ANTE TOCILJ*§, RENATE ALBRECHT§, ADA YONATH*‡ & FRANÇOIS FRANCESCHI§

* Max-Planck-Research Unit for Ribosomal Structure, Notkestrasse 85, 22603 Hamburg, Germany
‡ Department of Structural Biology, Weizmann Institute, 76100 Rehovot, Israel
§ Max-Planck-Institut für Molekulare Genetik, Ihnestrasse 73, 14195 Berlin, Germany
† These authors contributed equally to this work Correspondence and requests for materials should be addressed to F.F. (e-mail: Franceschi@molgen.mpg.de). Coordinates have been deposited in the Protein Data Bank under accession numbers 1JZX, 1JZY, 1JZZ, 1K00 and 1K01.

[Ribosomes, the site of protein synthesis, are a major target for natural and synthetic antibiotics.] [Detailed knowledge of antibiotic binding sites is central to understanding the mechanisms of drug action.][Conversely, drugs are excellent tools for studying the ribosome function.][To elucidate the structural basis of ribosome—antibiotic interactions, we determined the high-resolution X-ray structures of the 50S ribosomal subunit of the eubacterium *Deinococcus radiodurans*, complexed with the clinically relevant antibiotics chloramphenicol, clindamycin and the three macrolides erythromycin, clarithromycin and roxithromycin.][We found that antibiotic binding sites are composed exclusively of segments of 23S ribosomal RNA at the peptidyl transferase cavity, and do not involve any interaction of the drugs with ribosomal proteins.][Here we report the details of antibiotic interactions with the components of their binding sites.][Our results also show the importance of putative $Mg^{2+}$ ions for the binding of some drugs.][This structural analysis should facilitate rational drug design.]

Category = Medical — 701
Authors — 702
Research institutes — 703
Science concepts — 704

Fig. 10

"When has Ukraine had elections?"

<date>    "Ukraine"    "election(s)"
1003    1004    1005

Person    Location    End of sentence
1006    1007    1008

Politics Of Ukraine
[In [July 199-]. [Leonid Kuchma] was elected as [Ukraine]'s second president in free and fair elections.] [[Kuchma] was reelected in [November 1999] to another five-year term, with 56 % of the vote.] [international observers criticized aspects of the election, especially slanted media coverage; however, the outcome of the vote was not called into question.] [In [March 2002], [Ukraine] held its most recent parliamentary elections, which were characterized by the Organization of Security and Cooperation in Europe ([OSCE]) as flawed but an improvement over the 1998 elections.] [The pro-presidential "For a United [Ukraine]" bloc of former Prime [Minister Viktor Yushchenko], followed by the reformist "Our [Ukraine]" bloc and the Communist Party.] [There are 450 seats in parliament, with half chosen from party lists by proportional vote and half from individual constituencies.]

Date
Base = 2002-03-XX
1009

End of paragraph
1010

Acronym
Definition = Organization of Security and Cooperation in Europe
1011

1001

1002

Fig. 11

```
- <PLAY>
    <MAINTITLE>The Tragedy of Antony and Cleopatra</MAINTITLE>
  + <FM>
  + <PERSONAE>
    <SCNDESCR>SCENE In several parts of the Roman empire.</SCNDESCR>
    <PLAYSUBT>ANTONY AND CLEOPATRA</PLAYSUBT>
  - <ACT>
      <TITLE>ACT I</TITLE>
    - <SCENE>
        <TITLE>SCENE I. Alexandria. A room in CLEOPATRA's palace.</TITLE>
        <STAGEDIR>Enter DEMETRIUS and PHILO</STAGEDIR>
      + <SPEECH>
      + <SPEECH>
      + <SPEECH>
      + <SPEECH>
      + <SPEECH>
        <STAGEDIR>Enter an Attendant</STAGEDIR>
      + <SPEECH>
      + <SPEECH>
      - <SPEECH>
          <SPEAKER>CLEOPATRA</SPEAKER>
          <LINE>Nay, hear them, Antony:</LINE>
          <LINE>Fulvia perchance is angry; or, who knows</LINE>
          <LINE>If the scarce-bearded Caesar have not sent</LINE>
          <LINE>His powerful mandate to you, 'Do this, or this;</LINE>
          <LINE>Take in that kingdom, and enfranchise that;</LINE>
          <LINE>Perform 't, or else we damn thee.'</LINE>
        </SPEECH>
      - <SPEECH>
          <SPEAKER>MARK ANTONY</SPEAKER>
          <LINE>How, my love!</LINE>
        </SPEECH>
      + <SPEECH>
```

2001
```
<?xml:namespace ns = "http://www.w3.org/RDF/RDF/" prefix ="RDF" ?>
<?xml:namespace ns = "http://purl.oclc.org/DC/" prefix = "DC" ?>
<RDF:RDF>
  <RDF:Description RDF:HREF = "http://www.site.com/page.html">
    <DC:Creator>Joe Somebody</DC:Creator>
  </RDF:Description>
</RDF:RDF>
```

2002
```
<?xml:namespace ns = "http://www.w3.org/RDF/RDF/" prefix = "RDF" ?>
<?xml:namespace ns = "http://purl.oclc.org/DC/" prefix = "DC" ?>
<?xml:namespace ns = "http://person.org/BusinessCard/" prefix = "CARD" ?>
<RDF:RDF>
  <RDF:Description RDF:HREF = "http://www.site.com/page.html">
    <DC:Creator RDF:HREF = "#Creator_001"/>
  </RDF:Description>
  <RDF:Description ID="Creator_001">
    <CARD:Name>Joe Somebody</CARD:Name>
    <CARD:Email>somebody@somewhere.net</CARD:Email>
    <CARD:Affiliation>Somewhere, Inc.</CARD:Affiliation>
  </RDF:Description>
</RDF:RDF>
```

Fig. 21

User rating: ○○○○○
Boston: Jurys Boston Hotel: "brand new and trying to be the best"
July 17, 2004 ; A TripAdvisor Member, Chicago, IL We spent 3 nights at Jury's beginning on the 4th of July, they had just opened on the 2nd. Only 1/3 of the hotel was functioning, there are a few kinks being worked out, but great things are happening. The location is unbearable. Near shopping, metro, restaurants, we walked nearly everywhere. Safe, clean neighborhood just off the Park, and bordering Back Bay. The staff was so attentive, caring and friendly. The rooms are charming, soothing and the maid staff top notch. Try to get an upper level room, a few lower rooms open channel and even with their new windows. Charming, Irish service, and their restaurant menu looks fantastic. And it is just plain neat staying in the old Police Station!

Compare prices with:
[Quick Check]

User rating: ○○○○○
Boston: Jurys Boston Hotel: "Could not have been any better..."
July 30, 2004 ; A TripAdvisor Member, Montreal, Quebec I went down to Boston from the 19th to the 24th of July for 5 nights and stayed at the wonderful Jurys Hotel, located in the prime Back Bay Area. The hotel had just opened about 2 weeks ago...it was amazing. The room was gorgeous, nice bed, large 27" Panasonic TV, etc.. and the bathroom was quite large with nice amenities (my girlfriend loved the free Aveda products). I had never been to Boston before but when I return I will 100% stay at the Jurys Hotel. The night concierge recommended 3 unbelievable restaurants to us and really knew a lot about the city. All in all, if you are heading to Boston and don't mind spending a couple of bucks, stay at the Jurys!! The staff was really nice and extremely helpful.

Compare prices with:
[Quick Check]

Fig. 22

Waring PBB 201 / 204 / 209 / 212 Professional 2 Speeds Blender
Overall rating: ★★★★ ☆
Reviewed by 6 Epinions users Ease of Use
Durability
Ease of Cleaning
Style ● Compare Prices
● View Details
● Read Reviews Subscribe to reviews on this product Write a Review

2201

Read Review of Waring PBB 201 / 204 / 209 / 212 Professional Work...

Review Summary

Waring PBB Top Blender and Why You Should Purchase this Blender

2202

Author's Product Rating
★★★★

Ease of Use:
Durability:
Ease of Cleaning:
Style:

Pros
Solidly constructed, works well, good looking machine, will have it for decades

Cons
None that I have found

The Bottom Line
A great blender that you will own three decades from now

Full Review

2203

One of the best gifts we received from our wedding registry was a blender. I cannot tell you how many times we have thought about margarita's and other things that involve blending something and were unable because we did not have a blender. Alas, we now do and I think we have a pretty good one.

The Waring brand was the one that my mom suggested we look toward. Her belief is that they have been around forever and they have always been good to her. In other words, few spills and even fewer problems. So, that was what we went with on the registry and what we received as well.

INFORMATION ACCESS WITH USAGE-DRIVEN METADATA FEEDBACK

The present invention concerns a method for displaying, capturing and using document metadata within result presentations in information access systems, or in information search systems, wherein the method comprises steps for applying a query to a set of documents, identifying matching documents, and producing a result page with at least one of the most relevant documents, wherein the method includes using a metadata server capable of storing metadata associated with any searchable document, and providing means within the result page for end users of the information access or search system to view and edit metadata associated with the returned documents from the metadata server.

The present invention also concerns a search engine capable of supporting and implementing the method according to any of the preceding claims in information access or search systems, wherein the search engine is applied to accessing, searching, retrieving and analyzing information from content repositories available over data communication networks, including extranets and intranets, and presenting search and analysis results for end users.

Embodiments of the present invention relate to information retrieval methods and system where a user query is used to extract items or documents from a document repository. The term "document" shall everywhere in the following be used to denote any searchable entity and it could hence mean for instance a textual document, a multimedia item, a database record, or a XML structure.

Prior art systems have been designed for creating and maintaining metadata associated with documents. In particular, document management systems are designed to manage metadata and use this information to better support workflow around the modelled documents. Document management tools also provide search methods to access both document content and associated metadata. For instance International published patent application WO2005/091175A1 discloses a search system which allows users to annotate and view documents encountered in a corpus thereof including those returned in a search of the corpus. The annotations may include metadata related to the documents, and the metadata can be aggregated and applied to generating search results.

However, there is a need for making metadata management much more effective and relieve the burden on the user, and particularly to avoid cumbersome and time-consuming procedures of annotation.

In view of this, it is a primary object of the present invention to provide a directly embedded management in the browsing frame work of an information access system or search system.

It is also an object of the present invention to facilitate the application of metadata management to a broad set of searchable entities.

A further object of the present invention is to automate the metadata management.

A yet further object of the present invention is to allow a user to employ metadata for improving recall relevance and discovery for information access or search systems generally.

Finally, it is an object of the present invention to provide a search engine for implementing the method according to the invention in information access or search system.

The above objects as well as further features and advantages are realized with a method according to present invention, which is characterized by using a metadata server for automatically creating metadata objects associated with any combination of document, query and document position in the result set for the query.

The above objects as well as further features and advantages are also realized with a search engine according to the present invention and comprising a metadata server connected with or forming a part of the core search engine for storing, editing and presenting metadata to end users.

In an advantageous embodiment of the method according to the present invention access rights are used to control viewing and editing capabilities for the said metadata, whereby preferably document access rights in LDAP or Active Directory are used to control the said viewing and editing capabilities for the associated metadata, and wherein preferably user-defined groups can share viewing and editing of document metadata in a secure manner within communities.

In another advantageous embodiment of the method according to the present invention means are provided for improving the information access quality, said means comprising analyzing the metadata and deriving attributes relevant for search, and making the information access system responsive to said relevant attributes, said analyzing of metadata preferably including exposing free text and searchable attributes for further content refinement and indexing in the information access system or search system.

In yet another advantageous embodiment of the method according to the present invention means are provided for using the viewed and edited metadata from identified users or sessions as a basis for collaborative filtering analysis, and/or means for applying searches to all metadata associated with all documents in a result set, and/or means for information discovery on attributes explicitly represented in the metadata associated with all documents in a result set, and/or means for information discovery on attributes computed from the metadata associated with all documents in a result set.

A further advantageous embodiment of the method according to the present invention comprises steps for detecting and removing unwanted content in the captured metadata, preferably by presenting a so-called "human challenge" to avoid computer-generated metadata, and/or detecting and removing preferably offensive metadata entries.

Further features and advantages of the method according to the present invention shall moreover be apparent from the additional appended dependent claims directed to said method.

Figure 8:
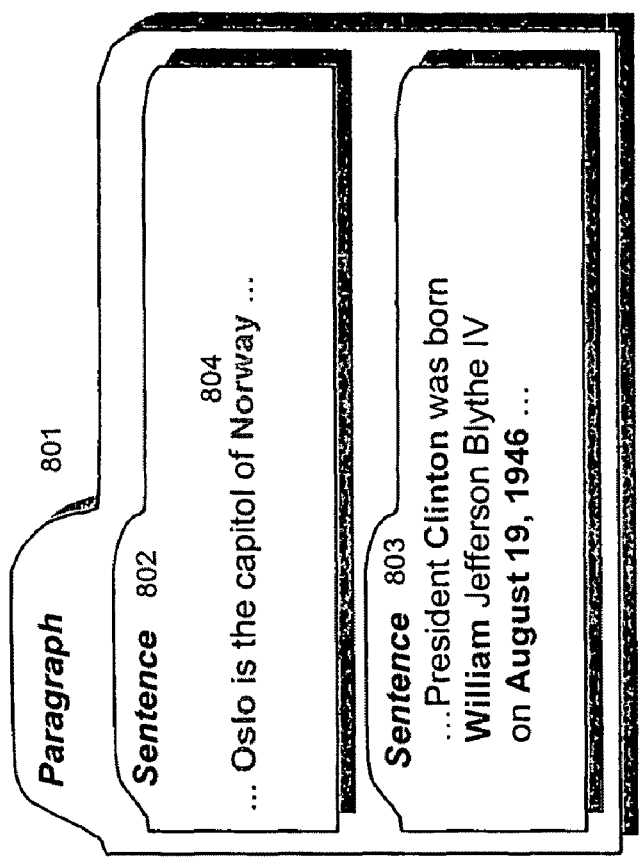
Figure 14:
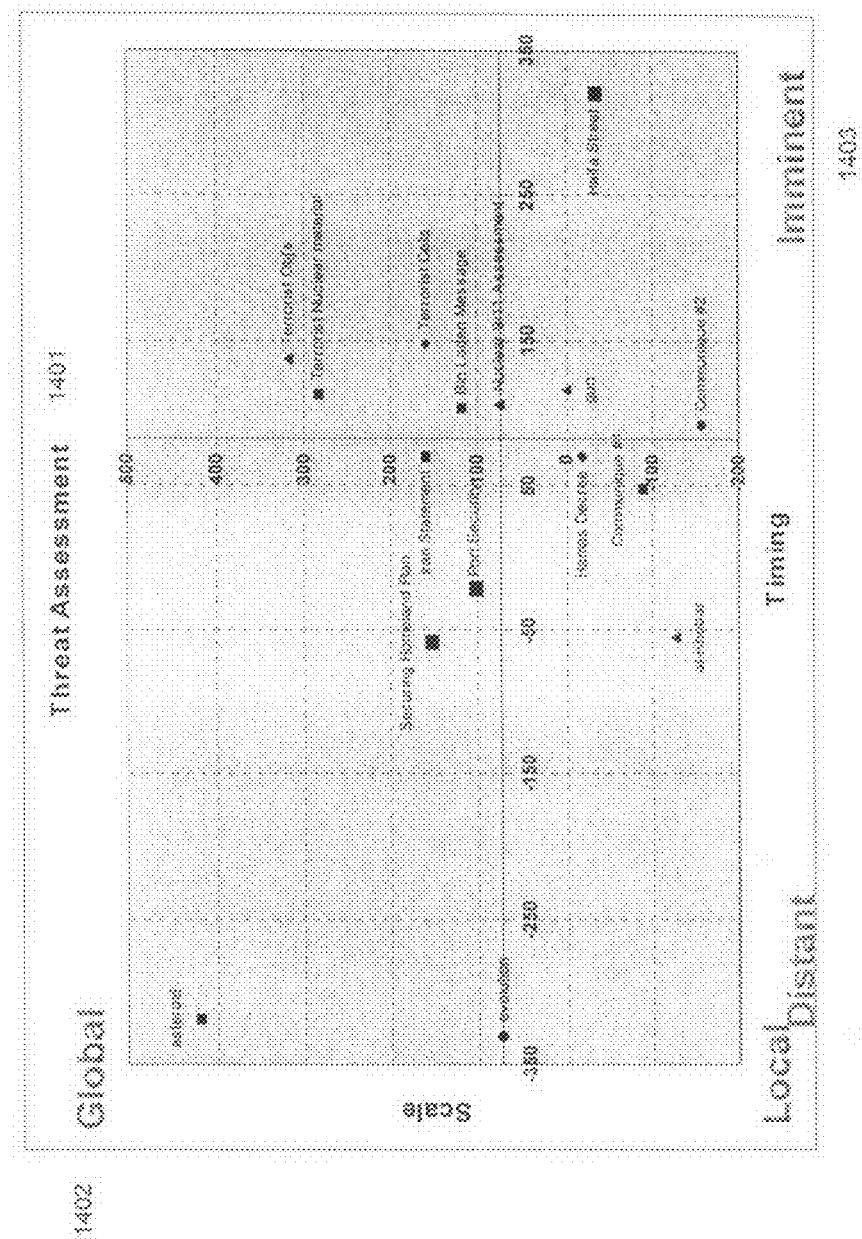

Now various preferred embodiments of the present invention shall be explained in more detail in the following and will be better understood when read in conjunction with the appended drawing figures, of which FIG. 1 shows a block diagram of an exemplary search engine architecture, as may be used with the method according to the present invention, FIG. 2 how document attributes can be summarized across a result set in various ways, FIG. 3 an example input text containing textual data and visual formatting elements, FIG. 4 how the example text in FIG. 3 can be automatically decomposed into semantic subsections, FIG. 5 a typical taxonomy structure and an example system for managing taxonomy properties, FIG. 6 part of speech tagging that finds the most likely grammatical representations for the input text, FIG. 7 how the example text in FIG. 3 can be automatically analyzed to identify both global properties such as a category and properties that are localized inside the document context, FIG. 8 a semantic decomposition of text into a paragraph containing multiple sentences with localized properties inside sentences, FIG. 9 how a query can be analyzed and normalized with linguistic techniques in order to improve the subsequent recall and/or precision of a search with normalized terms, FIG. 10 both a semantic decomposition of text with document properties embedded in the semantic structure and an approach for converting natural language queries into structured queries that utilizes the semantic document structure and associated properties, FIG. 11 an example text formatted as XML, FIG. 12 how summary information across result sets can be used to enable navigation experiences, FIG. 13 how a set of free formatted user reviews can be automatically rated with sentiment analysis technology, FIG. 14 how sentiment analysis methods can be extended to differentiate between other types of comparable concepts, FIG. 15 an example application where sentiments are scored for all documents in a result set and used to provide statistics and trend analysis, FIG. 16 how a search front end in an information access system can be specified, FIG. 17 a generic result page in an information access system, FIG. 18 an example of how document metadata can be integrated with blogs in a result page such that end users can view, edit and analyze the information, FIG. 19 how wikis can be used instead of blogs in a similar user experience as FIG. 18, FIG. 20 how metadata can be represented with RDF in a Dublin Core version and a W3C's vCard version, FIG. 21 how sentiment analysis can identify terms, concepts and part of speech with predictive capability for sentiment scoring, and FIG. 22 how typical product review sites are organized.

FIG. 1 shows typical key components in a search engine as can be used for implementing the method according to the present invention. Accessed, searched or retrieved information is provided by content repositories where content can either actively be pushed into the search engine, or via a data connector be pulled into the search engine. Typical repositories include databases, sources made available via ETL tools such as Informatica, any XML-formatted repository, files from file serves, files from web servers, document management systems, content management systems, email systems, communication systems, collaboration systems, and rich media such as audio, images and video. The documents are submitted to the search engine via content API 102. Subsequently, documents are analyzed in a content analysis stage 103 in order to prepare the content for improved search and discovery operations. Typically, the output of this stage is an XML representation of the input document. The output of the content analysis is used to feed the core search engine 104. The core search engine can typically be deployed across a farm of servers in a distributed manner in order to allow for large sets of documents and high query loads to be processed. The core search engine can accept user requests and produce lists of matching documents. The document ordering is usually determined according to a relevance model that measures the likely importance of a given document relative to the query. In addition, the core search engine can produce additional metadata about the result set such as summary information for document attributes. Alternatively, the output of the content analysis stage can be fed into alert engines 105. The alert engine will have stored a set of queries and can determine which queries that would have accepted the given document input. A search engine can be accessed from many different clients or applications. 109 and 110 illustrates mobile and computer based client applications. These clients will submit requests to the search engine query API 108. The search engine will typically have means to analyze and refine the query 106 in order to construct a derived query that can extract more meaningful information. Finally, the output from the core search engine 104 is typically further analyzed in order to produce information or visualizations that are used by the clients 109 and 110.

In order to manage metadata in a manner that implements the method according to the present invention in a search engine, the search engine as depicted in FIG. 1 also comprises a metadata server. This metadata server is not specifically shown, as it can be a part of the core search engine 103. It may, however, also be connected with the core search engine, but neither then need to be anything but a part of the core search engine as the core search engine in itself may be physically implemented on a plurality of distributed servers connected in a data communication network or a cluster of such servers physically for instance realized as a cluster of work stations.

In these latter cases of course a metadata server also can be implemented on one or more distributed or clustered servers forming the core search engine or implemented as one or more dedicated servers among the servers forming the core search engine.

Figure 2:
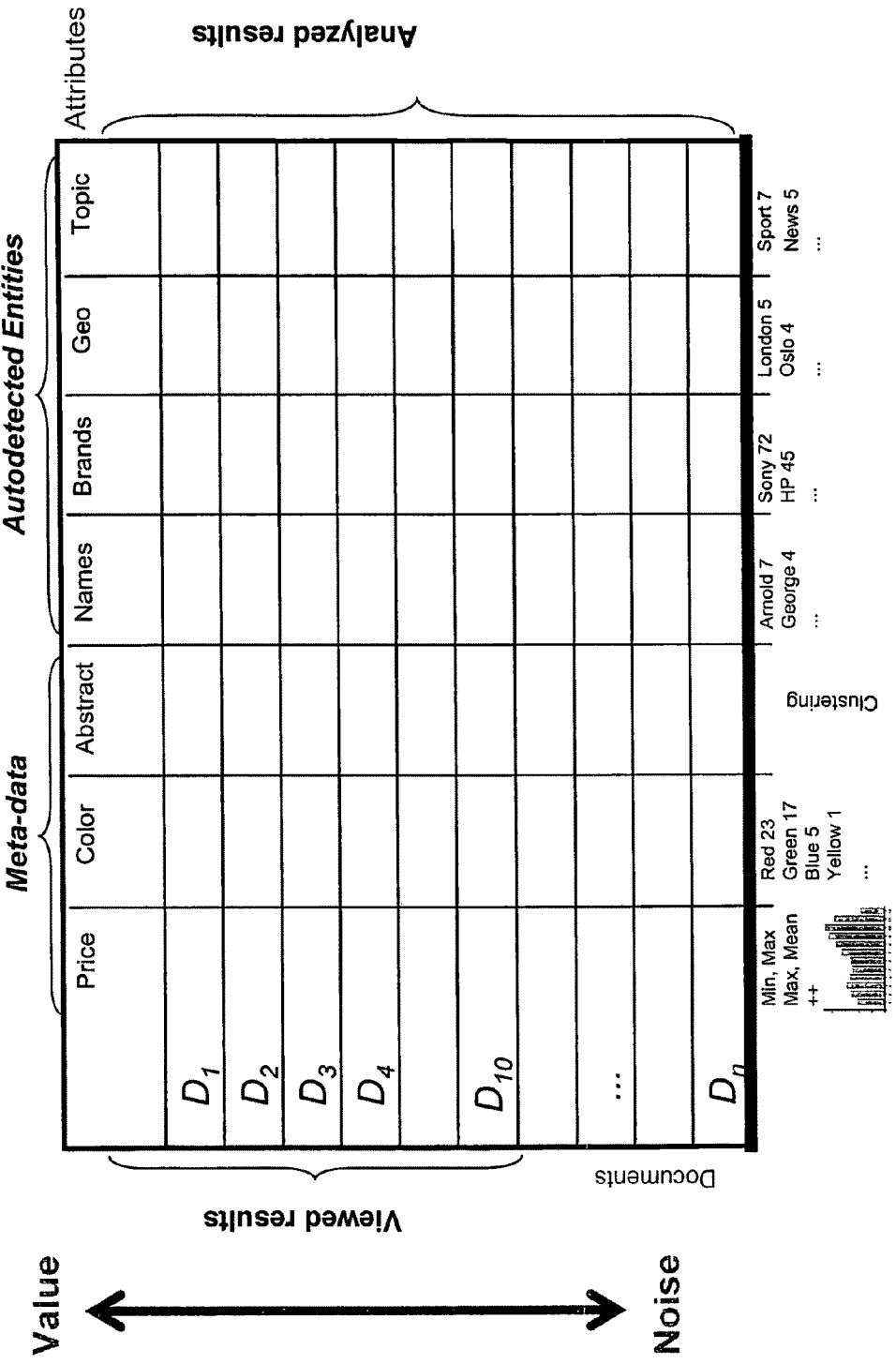

As a background to and in order to ease the understanding of the present invention there is in FIG. 2 shown how an example information access system computes document summary information. The query is first evaluated and returning a set of N matching documents. The relevance model is then used to rank the documents from most valuable to least valuable relative to the query (D1>D2>DN). Typically, a given number of the highest ranking documents are returned to the client and used to construct a result page. The attributes associated with the documents can be both metadata from the original content repository or metadata that has been discovered inside the content analysis 103. The summary information is either computed based on a certain number of the highest ranking documents or on all N documents that satisfy the query. FIG. 2 thus illustrates some examples of summary information such as frequency, histograms, and statistical parameters.

Content or documents being analyzed can as described for FIG. 1 come from many sources including databases, sources made available via ETL tools such as Informatica, any XML-formatted repository, files from file serves, files from web servers, document management systems, content management systems, email systems, communication systems, collaboration systems, and rich media such as audio, images and video. Many of these data sources can be further improved for search and discovery by doing targeted content analysis 103. As a case study on content and query preparation in search engines the following discussion illustrates some typical analysis steps.

Wholly generally embodied the present invention concerns a method and an apparatus for displaying and capturing metadata of documents from end users of an information access system. The invention teaches various ways to associate metadata to documents within a search result context. An active and collaborative end user experience is created by tightly integrating user feedback and metadata authoring within a search context.

A generally preferred embodiment of the method according to the present invention uses dynamic feedback from the metadata updates by end users to improve the quality of the information access system. The invention teaches specific methods to enhance recall, improve relevance and create new information discovery paradigms based on feedback between metadata and document representations Particularly advantageously the method according to the present invention can be applied in consumer search for web pages, multimedia content, products, mobile and similar content types. The improved recall, relevance and discovery mechanisms will improve the user experience for consumer search. One example is search for multimedia content which is limited by relatively little textual annotation and the absence of web page link cardinality as a primary relevance tool. The present invention will both generate added textual annotation and establish an endorsement based replacement of link cardinality as the key relevance component. Furthermore, the collaborative approaches taught by the present invention will enrich sites with sticky community capabilities. A more detailed discussion shall now be given of how searches with metadata discovery and representation of the discovered metadata for end users are used with emphasis on feedback to end users in order to next increase the quality of the search system.

FIG. 3 illustrates an example input of an article that contain implicit, visual structure such as titles, affiliations etc. Inside the content analysis stage 103 automated means can be deployed to recognize semantic structures by using rules responsive to vocabulary, grammatical patterns, formatting and visual layout. FIG. 4 illustrates how the input text from FIG. 3 has been analyzed and the text decomposed into semantic blocks of information such as title section 401, author section 402, affiliation section 403, and the abstract 404. FIG. 5 illustrates an example of how a category from a relevant taxonomy is assigned to the document. 501 illustrates an example of the hierarchical taxonomy and the figure indicates a typical user front end for how such taxonomies can be managed, updated and trained.

FIG. 6 illustrates how textual content can be analyzed with part-of-speech analysis to determine both possible and the most likely grammatical interpretation of the terms in the document. The output of such analysis can be used to identify general purpose document properties such as Noun-Noun expressions. Further analysis can turn generic grammatical interpretations around to specific terms, concepts or expression patterns that can encode highly targeted document attributes in a contextual way. FIG. 7 illustrates how a global attribute like the "medical" category assignment is associated with the input document. Furthermore, three example entities are identified within the context of the original document. FIG. 7 illustrates how author names 702, research institutes 703, and science concepts 704 have been identified within the original input document.

The above-discussed FIG. 4 illustrates how the input text can be decomposed into semantic structures that are application-specific. These structures are e.g. the above-mentioned semantic blocks of information and shall as shown in FIG. 8 enable the automatic identification of generic semantic concepts like titles, chapters, visual blocks, paragraphs, sentences, and entity information can be automatically identified. FIG. 8 shows paragraph decomposition 801 of a document with multiple sentence segments 803 inside the paragraph and various entities 804 located inside the sentence structures. The semantic decomposition can use simple elements as identification of tokens such as sentence breaks and paragraphs breaks in addition to various technologies available for recognizing entities. More elaborate patterns encoded in grammars can also be matched with the text and the matching relationships between the text and nodes in the grammar can be used to create a contextual decomposition of the document.

Figure 9:
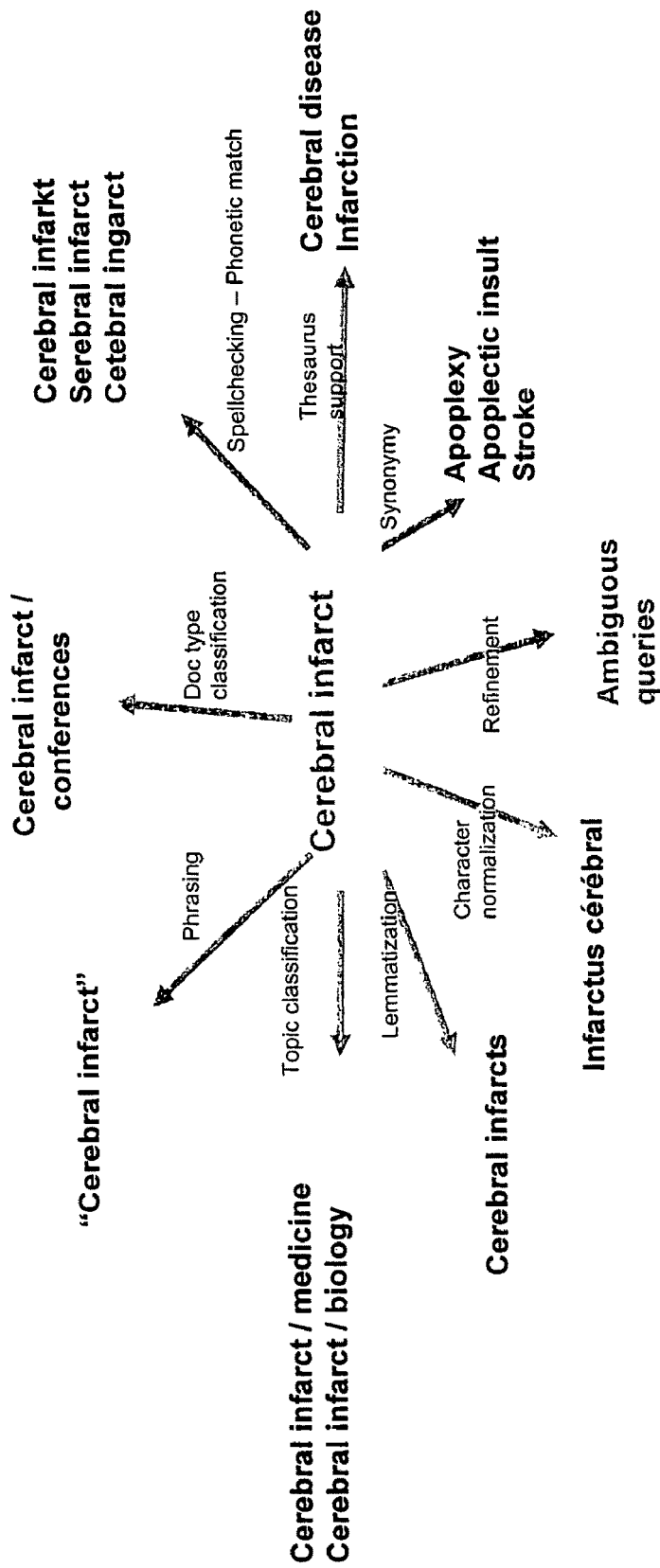

FIG. 9 illustrates how various linguistic techniques in a concrete example can be utilized to rewrite, normalize or expand the user query. This analysis will typically occur inside the query analysis module 106 and produce a modified query that is subsequently sent to the core search engine 104.

FIG. 10 illustrates document- and query analysis in an example search engine. The figure also illustrates how processing of natural language queries can be improved by access to contextual summary information. An input document 1002 is decomposed into paragraphs 1010 which are further decomposed into sentences 1008. Inside the sentences, ranges are marked up as document properties with specific values 1006 and 1007. The document properties can be recorded in both a full/original form and an associated base form. FIG. 10 illustrates two examples of this. 1009 shows an example where a date is both recorded in the original form (March 2002) and a normalized base form (2002-03-XX). The normalized base form simplifies profiling, range searching and robust generation of summary information. Examples of document properties that can be recognized in a similar way include person names, company names, locations, acronyms, dates, filenames, URLs, phone numbers, zip codes, email addresses, universities, newspapers, price information, product information, numerical attributes, and stock tickers. The document properties can either be associated with a given location in the document, an interval or a range in the document, a time or time interval in audio and video or a structure in an XML representation of the document.

FIG. 11 illustrates a typical XML input. The document is represented in a hierarchical manner and textual as well as any other type of attributes can be encoded at an arbitrary level. XPath and XQuery are examples of structured query languages that can be used to identify documents and sub-document structures with specific properties. In this example it is for instance possible to look for speeches where the speaker is Cleopatra and there is a line mentioning Caesar. The XML structure illustrated in FIG. 11 can either be the structure of the input document or a structure that is computed and encoded in the content analysis steps 103 for content of any type.

Figure 12:
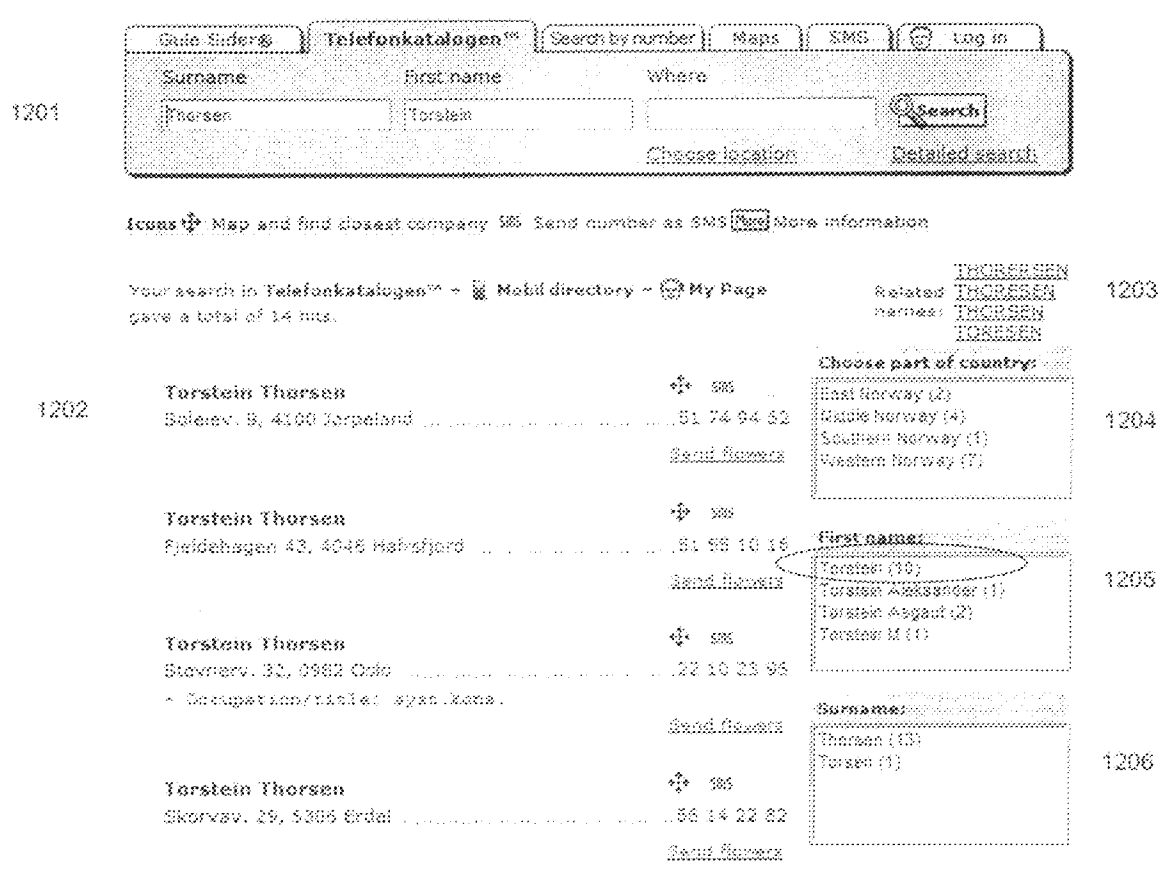

FIG. 12 illustrates how a name search 1201 in addition to the search results 1202 uses summary information to navigate and explore the result set. 1203 shows related names, 1204 shows geographical locations associated with the names, 1205 shows potential interpretations of the first name, and finally 1206 shows potential interpretations of the surname. In a highly organized database this type of summary information can be compute based on global document attributes. Contextual summary information enables a similar experience even for names, addresses and telephone numbers "hidden" inside larger textual documents.

Now a discussion how sentiment analysis is carried out and used in prior art shall be given with examples taken from description of offered services.

FIG. 13 illustrates how a set of free formatted user reviews for a hotel example 1301 can be automatically rated 1303 with sentiment analysis technology. One way to implement sentiment analysis is based on Turney's classification algorithm. Part of speech analysis and machine learning is used to identify text elements with predictive information for sentiment scoring. In this connection FIG. 21 shows how sentiment analysis can identify terms, concepts and part of speech with predictive capability for sentiment scoring. FIG. 22 illustrates how typical product review sites such as ePinion are organized. Summary information across all reviews is displayed in 2201 and individual reviews are segmented into: (a) summary information with scoring of relevant attributes 2202; and (b) a complete free text review 2203. FIG. 14 illustrates how sentiment analysis methods can be extended to differentiate between other types of comparable concepts. The machine learning algorithm has in this case substituted positive/negative training samples with either "global threat"/ "local threat" 1402 or "imminent threat"/"distant threat" 1403.

Figure 15:
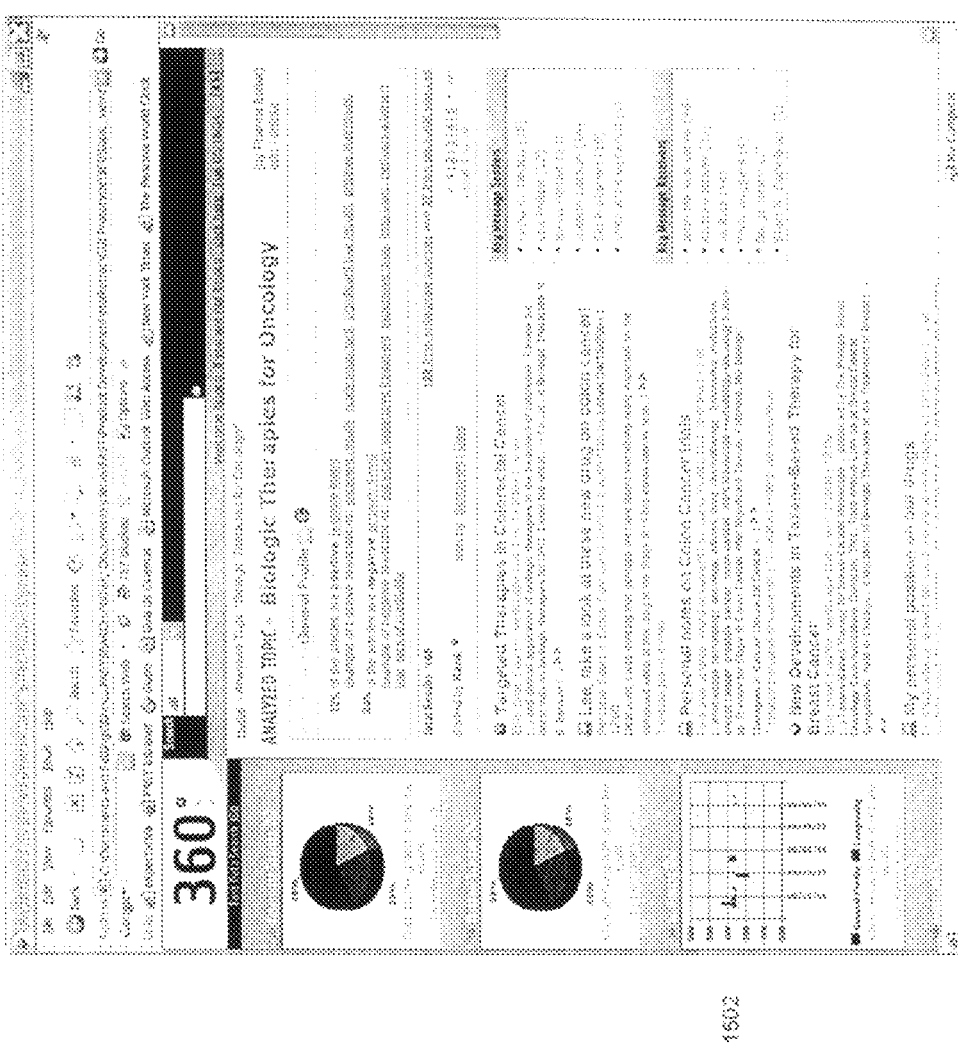

FIG. 15 illustrates an example application where sentiments are scored for all documents in a result set and used to provide statistics and trend analysis. 1501 indicates the summary statistics for sentiments across the result set and 1502 visualizes trends in the average sentiment scores as a function of time.

Figure 16:
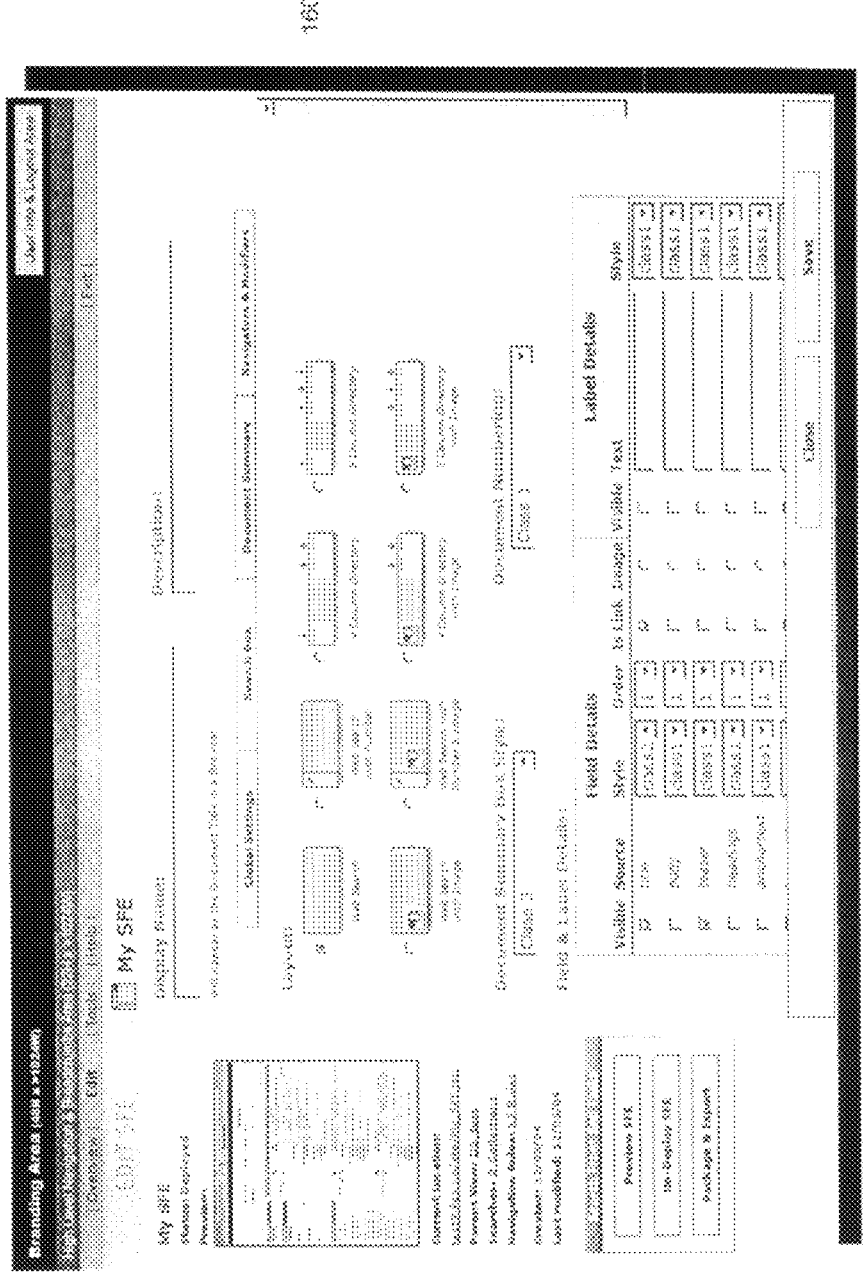
Figure 17:
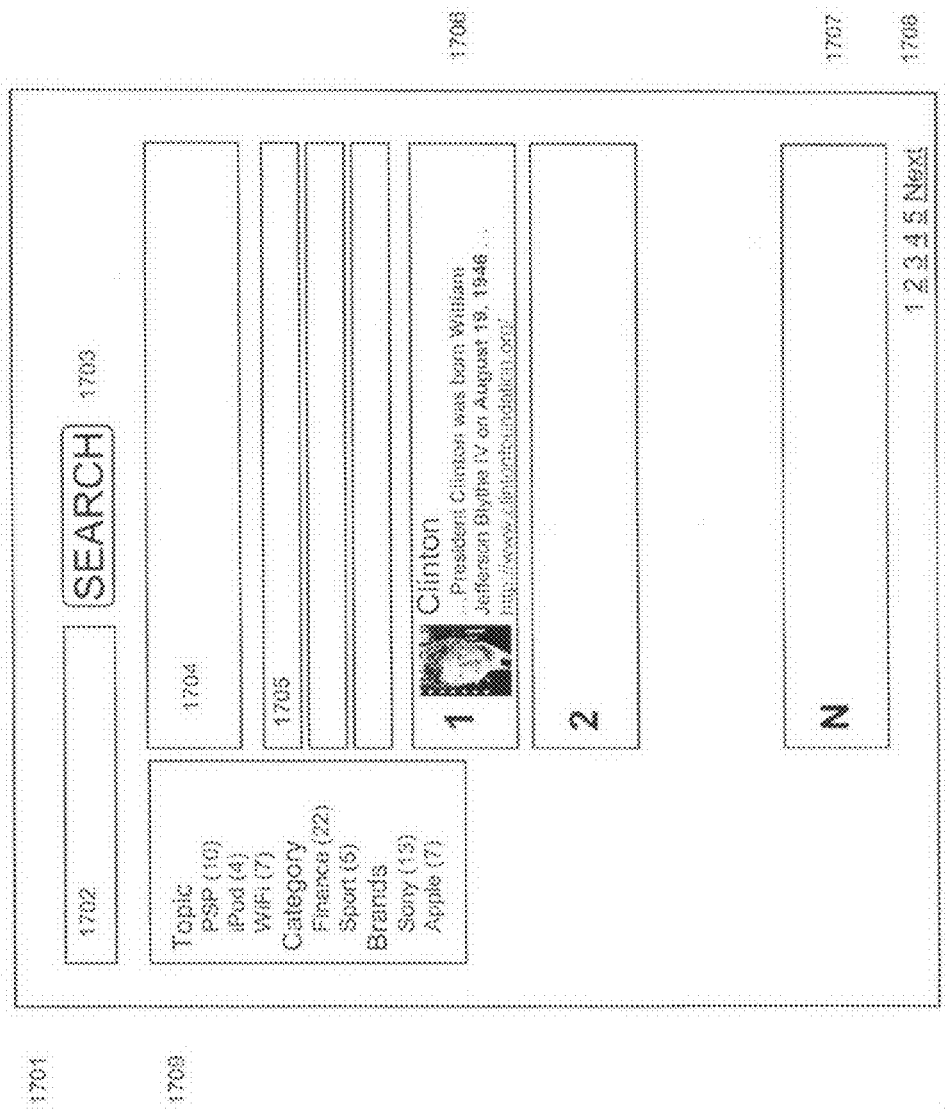

FIG. 16 illustrates how a search front end in an information access system can be specified. The configuration studio for the search front end allows the user to select result and discovery widgets with associated formatting. Access and display driven by content schemas can also be specified. An example end result of such a front end customization is given by FIG. 17 that illustrates a generic result page 1701 in an information access system. The figure shows the search input area 1702; search button 1703; screen estate for flash-in information (such as stock info for ticker search, or weather for weather searches etc.) 1704; screen estate for sponsored links (paid listings) 1705; the actual search results (usually a title, static or dynamic teaser/snippet, document reference and potentially a graphical thumbnail) 1706/1707; means to move between result pages 1708; and global or contextual summary information for the result set 1709 enabling the user to limit the result set to topics of interest.

Figure 18:
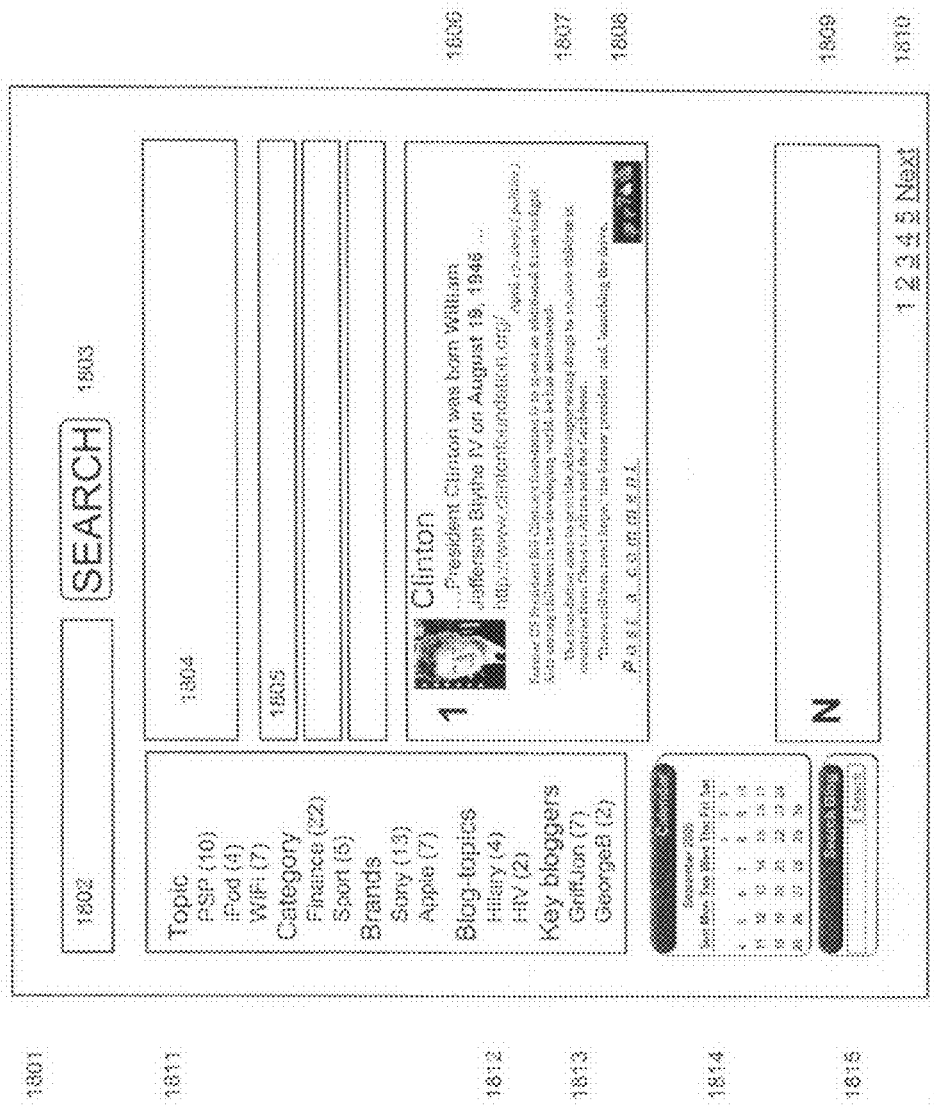

FIG. 18 illustrates an example of how document metadata can be integrated with blogs in a result page such that end users can view, edit and analyze the information. FIG. 18 illustrates a blog enriched result page 1801 in an information access system. The figure shows the search input area 1802; search button 1803; screen estate for flash-in information (such as stock info for ticker search, or weather for weather searches etc.) 1804; screen estate for sponsored links (paid listings) 1805; means to move between result pages 1810; and global or contextual summary information for the result set 1811 enabling the user to limit the result set to topics of interest. 1806 and 1809 show example search results. 1806 has in addition to the normal search result added visualization of associated metadata in the form of a blog 1807. There are obviously many ways that the blogs or metadata in general can be visually associated with the search results. Every search result can have embedded metadata display (as in FIG. 18), mouse-over/hovering can activate access to metadata or an active result concept can be used to populate one shared metadata widget for the complete result page. Blogs are just one of many means for visualizing and editing document metadata. The end users can also post new entries to the blog or rate content 1808. The information discovery 1811 has been extended with discovery on metadata either explicitly captured in 1807 or derived through analysis of the captured document metadata. 1812 gives an example of how topics found in all blogs associated with documents in the complete result set can be visualized. 1813 shows how all people contributing to the blogs associated with documents in the complete result set can be visualized. The examples in 1812, 1813 can be applied to all explicit information/attributes in the metadata object as well as implicit attributes identified by content refinement similar to the document analysis in 103. Blog entries are typically chronographically ordered and a calendar display 1814 can be used to visualize and explore blogs across the complete result set. Specific search means can also be provided to explore all blogs associated with documents in the complete result set 1815.

Figure 19:
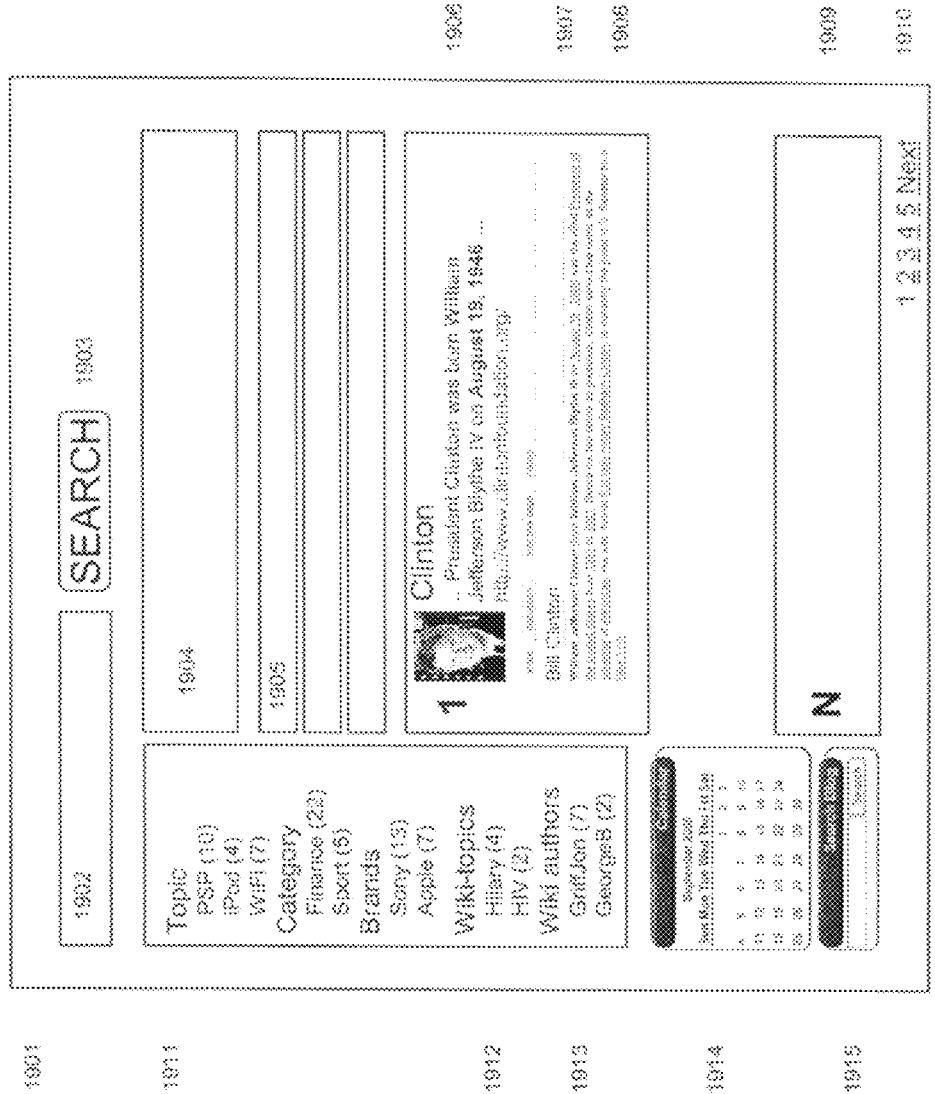

FIG. 19 shows how wikis can be used instead of blogs in a similar user experience as FIG. 18. The figure illustrates the wiki managed metadata 1908 and typically how users can edit/update the wiki information 1907. Wikipedia is an example of how the wiki concept can be used to allow users to update articles in an encyclopedia. FIG. 19 shows how the same concept can be used to manage metadata associated with documents within a search result context.

FIG. 20 shows how metadata can be represented with RDF in a Dublin Core version and a W3C's vCard version. The Semantic Web refers to a collection of standards, products and ongoing projects under the direction of the World Wide Web Consortium (W3C) which aim to make it possible for computers to exchange and act on information—particularly web documents. The XML-based Resource Definition Framework (RDF) and Web Ontology Language (OWL) are particularly important components of the Semantic Web as they allow web page authors to expose information in a machine-usable way. 2001 shows an example of the Dublin Core schema, intended for cataloguing electronic resources. One of RDF's strengths is the ability to use multiple schemas. 2002 shows an example of the W3C's "vCard" schema to expose additional metadata and associate it with "Joe Somebody".

The method of the present invention is implemented on a search engine comprising a metadata server as discussed above in connection with FIG. 1. As such, a metadata server incorporated in the search engine or an information access or search system shall by implementing the method of the invention provide a much more efficient and end user-friendly manner of managing metadata generally, but particularly a metadata server as used with the method of the present invention shall enrich the search experience with interactive viewing and editing of document metadata.

Blogs and wikis are two examples of established technologies for managing unstructured metadata. Similarly, databases are often used to capture structured metadata. Both structured and unstructured metadata can be combined in a common repository via an information access system. The metadata server used in this invention automatically creates viewable and updatable metadata for any searchable entity in the associated search.

Normally, the metadata server will hence create an empty metadata object with every indexed document ID—or use lazy evaluation and establish metadata objects as they are needed in the display of search results. By linking the metadata objects to documents, metadata will follow documents independent of which query that was performed when the metadata was updated. Alternatively, metadata objects can link to a combination of the associated document and the query performed when the metadata was updated. This approach will create more context specific metadata. Finally, the document position in the result set can also be used to either create or annotate metadata updates. A typical use case of this will be to let the user impact ranking by being positive or negative to the current ranking of a concrete search result.

Metadata can also be associated with document subsections. Examples include: associating metadata to conceptual units inside the document such as the title/author/affiliation/ abstract sections in FIG. 4; associating metadata to specific locations inside documents such as illustrated with the entities in FIG. 10; identifying frames or scenes represented by timings or time intervals inside audio and video; and direct association to semantic elements captured in a XML representation of the document such as illustrated in FIG. 11.

The metadata server can manage a mixture of metadata types including free text, audio clips, video clips, images, predefined entries, emotion icons, values to predefined attributes, user defined attributes with associated values, links to associated documents or links to associated people. Appropriate UI elements must be provided to allow the end users to effectively view and edit the various metadata types.

User access rights can also be activated for the access to view and edit metadata. Since, metadata are associated with documents it will usually be possible to use the document access rights (for instance maintained in LDAP or Active Directory) to also impact the associated metadata object. Alternatively, specific user rights can be maintained in the information access system such that various groups can share metadata objects in a secure manner.

Access rights and user access are particular relevant when the present invention is for enterprise search applications such as intranets, knowledge management and various forms of business intelligence. Within such a group of trusted peers the present invention teaches ways to simplify metadata management, expert location, collaboration and in general creating dynamic and improved information access systems.

The captured metadata can be used to dynamically improve recall, relevance and discovery capabilities for the information access system. Document recall can be improved by adding metadata content to the searchable information associated with a document. This includes metadata such as free text and explicit attributes. Multimedia and mobile are to sample applications where the content typically has limited textual annotation. Associating annotations from search usage as searchable information will improve recall dramatically. The content of the metadata object can be analyzed by the content refinement framework 103 in the same way as the original documents. Hence, all methodology and examples described in the context of FIGS. 1-15 and FIGS. 21-22 also apply to analysis of metadata objects. Typically, one metadata object will contain multiple user inputs as for instance separate blog entries that can be analyzed as separate documents and combined to give summaries for average opinions. In addition to increased recall, extracted attributes from the metadata objects will enrich the information discovery process as illustrated in FIG. 18.

Relevance or search precision can also be improved by incorporating user activity with document metadata in the ranking framework. Examples include:

Using the amount of metadata viewing and editing activity to boost the relevance of the associated document
  Using the number of recent updates in the metadata to boost the relevance of the associated document
  Ranking hits in recent metadata updates higher than hits in old metadata updates
  Using explicit user endorsements to change ranking for the document relative to the search context where the endorsements were captured
  Performing sentiment analysis on the free text of the metadata to derive an automatic sentiment score to boost the relevance or sort the associated documents The present invention can be deployed in closed environments such as enterprise search for trusted peers. In consumer search deployments of the present invention metadata can be polluted by various forms of spam sources. These deployments benefit from methods detecting and removing unwanted data in the captured metadata. One example of such methods is the presentation of a "human challenge" to enable the user to update any metadata. A "human challenge" can for instance be to ask the user to write down the text inside a distorted image. Metadata objects can also be classified into offensive and non-offensive categories by using prior art algorithms for text categorization.

The metadata objects can make explicit links (such as described in FIG. 20) and implicit links (such as described in FIG. 10) to people. The metadata server can obviously also capture the ID of the person that updated the metadata. Search and analysis of people across all metadata objects associated with documents in a search result set will hence be a dynamic and effective way to model areas of expertise. Effective expertise localization inside companies is one of the use cases for identification of relevant people. Another use case is creation of collaborative user experiences in consumer search applications.

A particularly preferred embodiment of the method of the present invention relates to collaborative filtering where the end users interaction with document metadata within a search context is used to create recommender systems and personalized optimizations.

Collaborative filtering is a method where virtual "shopping bags" are created of related documents. Within the context of the present invention "shopping bags" can for instance be created from all documents/metadata updated by the same user. These "shopping bags" are made searchable with either a specific document/metadata as input or another "shopping bag" that can represent a personal profile. Similar "shopping bags" are then identified and statistical summary information can be computed across the matching "shopping bags" as illustrated in FIG. 2 for a normal document search. The statistical summary information will identify related documents based on usage (such as Amazon's "people who bought this book also bought . . . ") and personalized recommendations.

The proposed tight integration between user updatable metadata and search results can also be used to improve location based search services. The metadata objects can be used in a location context if the associated documents are geo-localized either by longitude/latitude coordinates or semantic locations such as a state or a country.

From the foregoing discussion of embodiment and applications it is seen that the present invention takes a search centric approach and will greatly enrich the search experience by embedding metadata management directly into the browsing framework of an information access system or search system. Compared to prior art document management the present invention provides for applying metadata management to a much broader set of searchable entities (including rows in databases), and usage thus becomes dramatically simplified since all metadata management is automated and accessed via the search functionality. Furthermore, the present invention allows end user interaction with metadata to improve recall, relevance and discovery abilities for the information access system.

The method according to the present invention shall make it possible to provide an alternative search centric approach to document management by embedding metadata management directly into the browsing framework of an information access system. Compared to prior art document management this invention teaches ways to apply metadata management to a much broader set of searchable entities (including rows in databases) and usage becomes dramatically simplified since all metadata management is automated and accessed via the search functionality.

Advantageously the method of the present invention can be used for mobile search applications. Mobile applications are often limited by the same absence of rich textual annotation and good relevance models in the same way as multimedia search. Furthermore, mobile applications require extreme precision in the search functions and dynamic, collaborative user experiences have proven to be a very effective user interaction model. This invention teaches methods that will improve both recall/precision, real-time and collaborative capabilities of mobile search.

The present invention discloses how a search experience can be turned into a more active and collaborative experience that will drive user satisfaction both for consumer and enterprise deployments of the information access or search system.

Furthermore, the present invention employs user interaction with metadata embedded in search results to create a unique information source for additional services, including high quality expert location, location-based search, trend analysis, community building and collaborative filtering for recommendations or personalized presentations.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for displaying, capturing and using document metadata within result pages in an information access system, wherein the method comprises:
    storing, by the information access system, a first metadata object, the first metadata object containing chronologically-ordered entries that contain content posted by users of the information access system regarding a given document, at least one of the entries containing content created by a first user of the information access system;
    receiving a query from a second user of the information access system; and
    in response to receiving the query:
        identifying matching documents, the matching documents being documents that are returned by applying the query to a set of documents, the matching documents including the given document; and
        producing, by a server in the information access system, a result page including a first area containing a title of the given document and a snippet of the given document, a second area containing a title of a second document and a snippet of the second document; wherein the first area includes one or more of the entries in the first metadata object, wherein the first area includes an element for posting the new entry to the first metadata object, wherein the second area includes text in the second metadata object, and an element for editing the text in the second metadata object,
        receiving the new entry from the second user; and
        receiving input from the second user, the input representing edits to the text in the second metadata object.

2. A method according to claim 1, wherein the subsection of the given document corresponds to a semantic element in an XML representation of the given document.

3. A method according to claim 1, wherein the metadata in the second metadata object is wiki managed.

4. A method according to claim 1, wherein the first metadata object includes at least one of: free text, audio clips, video clips, images, predefined entries, emotion icons, values to predefined attributes, user defined attributes with associated values, links to documents associated with the given document, or links to people associated with the given document, and
    wherein either the Resource Description Framework (RDF) or Web Ontology Language (OWL) is used to encode the said first metadata object.

5. A method according to claim 1, further comprising:
    using Lightweight Directory Access Protocol (LDAP) or Active Directory to manage access rights of end users of the information access system, the end users including the first user and the second user;
    controlling whether the second user is able to view and edit metadata in metadata objects associated with the matching documents based on the access rights of the second user, and
    maintaining the access rights of the users such that users in user-defined groups can share viewing and editing of document metadata in a secure manner.

6. A method according to claim 1,
    wherein the method further comprises: analyzing the entries in the first metadata object to derive attributes relevant for search,
    wherein identifying the matching documents comprises: using the attributes to identify the matching documents, and
    wherein said analyzing of the entries in the first metadata object comprises: analyzing free text and explicit attributes of the first metadata object to derive the attributes.

7. A method according to claim 6, further comprising:
    ranking the matching documents responsive to the metadata in metadata objects associated with the matching documents, wherein the ranking of the given document is boosted based on an amount of viewing and editing activity in the first metadata object, a number of recent entries in the first metadata object, a number of explicit positive endorsements of the given document, or a sentiment score for the given document,
    wherein the sentiment score for the given document is derived from the free text of the first metadata object.

8. A method according to claim 1, wherein producing the result page comprises producing the result page such that the result page contains one or more elements for allowing the second user to view the entries in the first metadata object and add entries to the first metadata object when the first metadata object is linked to a combination of the given document and the query.

9. A method according to claim 8, further comprising: using users' interaction with metadata objects within a search context to create recommender systems.

10. A method according to claim 1, further comprising:
    presenting a "human challenge" before allowing the second user to post the new entry to the first metadata object; and
    automatically detecting and removing offensive entries in the first metadata object.

11. A method according to claim 1, wherein the result page lists people that contributed the entries to the first metadata object.

12. A method according to claim 1, wherein the first metadata object includes a location value annotating the given document.

13. The method of claim 1, wherein the given document is audio or video and the subsection of the given document corresponds to a specific time or a time interval inside the audio or video.

14. A method for displaying, capturing and using document metadata within result pages in an information access system, the method comprising:
- managing access rights of end users of the information access system using Lightweight Directory Access Protocol (LDAP) or Active Directory, the end users including a first user and a second user;
- generating a set of metadata objects, the set of metadata objects containing a separate metadata object associated with each document in a set of documents, the set of documents including a first document and a second document, the metadata objects including a first metadata object and a second metadata object, the first metadata object associated with the first document, the second metadata object associated with the second document,
  - the first metadata object containing chronologically-ordered entries regarding the first document, at least one of the entries received from the first user,
  - the second metadata object containing text, the text in the second metadata object edited by at least one of the end users of the information access system,
  - wherein at least one of the metadata objects includes at least one of: free text, audio clips, video clips, images, predefined entries, emotion icons, values to predefined attributes, user defined attributes with associated values, links to documents associated with a document in the set of documents, or links to people associated with a document in the set of documents,
  - wherein at least one of the metadata objects is encoded in either the Resource Description Framework (RDF) or the Web Ontology Language (OWL),
  - wherein the first metadata objects includes links to people that edited the entries in the first metadata object,
  - wherein at least one of the metadata objects includes a location value associated with a document in the set of documents;
- analyzing metadata in the metadata objects to derive attributes relevant for search, wherein said analyzing the metadata in the metadata objects comprises analyzing free text and explicit attributes of the metadata objects to derive the attributes;
- receiving a query from the second user via a data communication network;
- in response to receiving the query:
  - identifying matching documents using the attributes, the matching documents being documents that are returned by applying the query to the set of documents, the matching documents including the first document and the second document;
  - ranking the matching documents responsive to the metadata in the metadata objects associated with the matching documents,
    - wherein the rankings of the matching documents are boosted based on amounts of metadata viewing and editing activity in the metadata objects associated with the matching documents, based on numbers of recent updates to the metadata objects associated with the matching documents, based on a number of explicit positive endorsements of the matching documents, and based on sentiment scores of the matching documents,
    - wherein the sentiment scores of the matching documents are derived from free text of the metadata objects associated with the matching documents;
  - determining that the access rights of the second user allow the second user to view the entries in the first metadata object, post a new entry to the first metadata object, view the text in the second metadata object, and edit the text in the second metadata object;
  - producing, by a server, a result page having a first area and a second area, the first area containing a title of the first document and a snippet of the first document, the second area containing a title of the second document and a snippet of the second document,
    - wherein the first area includes one or more of the entries in the first metadata object,
    - wherein the first area includes an element for posting the new entry to the first metadata object,
    - wherein the second area includes the text in the second metadata object, and an element for editing the text in the second metadata object;
  - receiving the new entry from the second user; and
  - receiving input from the second user, the input representing edits to the text in the second metadata object.

15. A system for displaying, capturing and using document metadata within result pages in an information access system, comprising:
- a memory and a processor;
- storing in the memory, by the information access system, a first metadata object, the first metadata object containing chronologically-ordered entries that contain content posted by users of the information access system regarding a given document, at least one of the entries containing content created by a first user of the information access system;
- receiving a query from a second user of the information access system; and
- in response to receiving the query:
  - identifying matching documents, the matching documents being documents that are returned by applying the query to a set of documents, the matching documents including the given document; and
  - producing, by a server in the information access system, a result page including a first area containing a title of the given document and a snippet of the given document, a second area containing a title of a second document and a snippet of the second document; wherein the first area includes one or more of the entries in the first metadata object, wherein the first area includes an element for posting the new entry to the first metadata object, wherein the second area includes text in the second metadata object, and an element for editing the text in the second metadata object,
  - receiving the new entry from the second user; and
  - receiving input from the second user, the input representing edits to the text in the second metadata object.

16. The system of claim 15, wherein the first metadata object includes at least one of: free text, audio clips, video clips, images, predefined entries, emotion icons, values to predefined attributes, user defined attributes with associated values, links to documents associated with the given document, or links to people associated with the given document, and wherein either the Resource Description Framework (RDF) or Web Ontology Language (OWL) is used to encode the said first metadata object.

17. The system of claim 15, further comprising:
- using Lightweight Directory Access Protocol (LDAP) or Active Directory to manage access rights of end users of the information access system, the end users including the first user and the second user;

controlling whether the second user is able to view and edit metadata in metadata objects associated with the matching documents based on the access rights of the second user, and maintaining the access rights of the users such that users in user-defined groups can share viewing and editing of document metadata in a secure manner.

18. The system of claim 15, wherein the method further comprises: analyzing the entries in the first metadata object to derive attributes relevant for search, wherein identifying the matching documents comprises: using the attributes to identify the matching documents, and wherein said analyzing of the entries in the first metadata object comprises: analyzing free text and explicit attributes of the first metadata object to derive the attributes.

19. The system of claim 18, further comprising:

ranking the matching documents responsive to the metadata in metadata objects associated with the matching documents, wherein the ranking of the given document is boosted based on an amount of viewing and editing activity in the first metadata object, a number of recent entries in the first metadata object, a number of explicit positive endorsements of the given document, or a sentiment score for the given document, wherein the sentiment score for the given document is derived from the free text of the first metadata object.

\* \* \* \* \*